Aug. 6, 1946.                    W. H. SILVER                    2,405,334
AUTOMATIC DEPTH CONTROL FOR AGRICULTURAL IMPLEMENTS
Filed June 19, 1941

INVENTOR
WALTER H. SILVER
ATTORNEYS

Patented Aug. 6, 1946

2,405,334

UNITED STATES PATENT OFFICE 2,405,334

AUTOMATIC DEPTH CONTROL FOR AGRICULTURAL IMPLEMENTS

Walter H. Silver, Moline, Ill., assignor to Deere & Company, Moline, Ill., a corporation of Illinois Application June 19, 1941, Serial No. 398,781

14 Claims. (Cl. 97—50)

The present invention relates generally to agricultural machines and more particularly to ground working implements in which ground working tools are provided.

The object and general nature of the present invention is the provision of depth controlling means deriving operating energy from the tractor engine and automatically responsive to changes in the depth of operation of the tool or tools, whereby substantially constant depth of operation may be maintained automatically at any desired depth. More specifically, it is a feature of this invention to provide an implement having a movable ground engaging shoe or gauge member, movement of which relative to the implement automatically controls the application of power from the tractor to the depth adjusting mechanism so that if it should occur that the tools momentarily tend to run deeper or more shallow than the desired setting, the mechanism is operative to readjust the depth controlling means so as to momentarily readjust the depth of operation so as to bring the tools back to the desired position.

A further important feature of this invention is the provision of atomatic depth gauging mechanism which includes parts extending through or passing near the axis of relative movement between the implement and the tractor so that the source of power on the latter may be made effective to control the depth of operation of the implement but without in any way affecting the freedom of movement of the implement relative to the tractor which propels it. It is also a feature of this invention to utilize the depth controlling mechanism which also does not interfere with the freedom of movement of the tool or tools relative to the tractor.

These and other objects and advantages of the present invention will be apparent to those skilled in the art after a consideration of the following detailed description taken in conjunction with the accompanying drawing which shows illustrative embodiments of this invention.

Figures 1, 2:
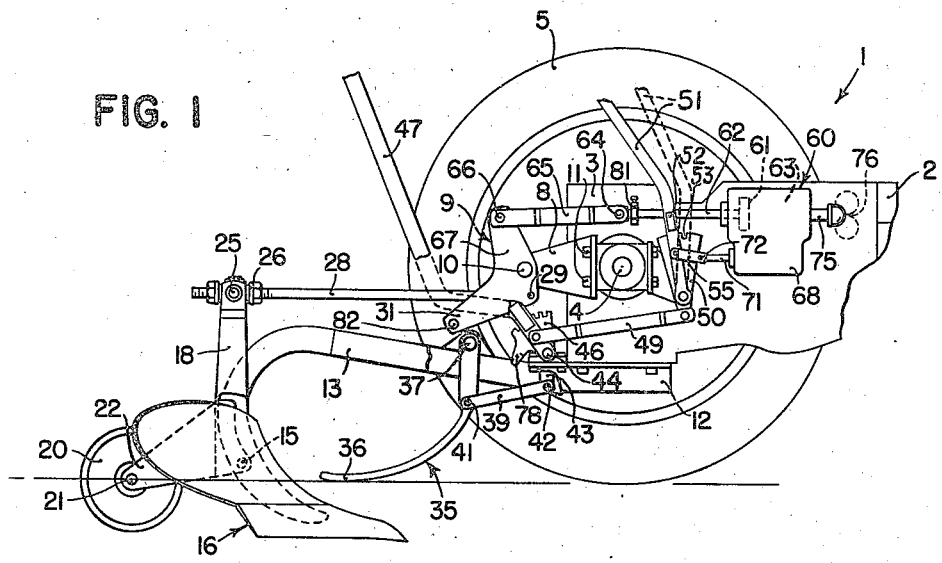
Figure 1 is a side view of a tractor plow in which the tool means is connected with the tractor by a pair of vertically spaced links which pivot relative to the tractor so as to permit the tool means to float relative thereto, with means on the tractor for adjusting the operating depth and automatic gauge means responsive to changes in the operating depth for controlling the depth adjusting means.
Figure 2 is a side view of a modified form of this invention, incorporating a plowing implement in which the plow beam is connected with the tractor at a hitch point and is capable of relatively free floating movement relative to the tractor.

Referring first to Figure 1, which shows one form of the present invention, the reference numeral 1 indicates in its entirety a farm tractor having a motor 2 of conventional construction, the transmission housing of which is connected to a rear axle housing 3 carrying axle shafts 4 on which rear wheels 5 are fixed. The tractor 1 serves as a mobile support or supporting frame for ground working units of various kinds. A pair of brackets 8 are bolted, as at 11, to the rear axle housing of the tractor and provide a support for a bell crank 9 which is preferably mounted on a pivot shaft 10 supported by the brackets 8. Secured to the lower portion of the rear axle housing are a pair of draft angles 12 between which the front end of a plow beam 13 is pivoted, the plow beam 13 preferably consisting of two forwardly diverging members similar to the lister plow shown in my co-pending application, Serial No. 314,821, filed January 20, 1940, now U. S. Patent 2,354,886, issued August 1, 1944. The rear end of the plow beam 13 curves downwardly and is pivoted, as at 15, to a furrow opener indicated in its entirety by the reference numeral 16. Preferably, the pivot 15 is formed at the lower end of a standard 18 that is fixedly secured to the frog of the furrow opener 16. A gauge wheel 20 is journaled on an axle 21 that is carried by a pair of brackets 22 suitably connected with the plow bottom or furrow opener 16 and/or its standard 18. The upper end of the latter carries pivot means 25 on which a sleeve 26 is carried, and the latter adjustably receives the rear end of a link 28. The forward end of the latter is pivoted, as at 29, to one of the arms, indicated at 31, that form the bell crank 9 mentioned above.

From the description so far it will be seen that the furrow opener 16 is connected for relatively free floating vertical movement with respect to the tractor 1 since the members 13 and 28 are each pivotally connected to the tractor and to the standard 18 at vertically spaced points. In this respect, therefore, the plow beam 13 serves as a link member cooperating with the link member 28 and the two link members serve generally as draft means or hitch means for connecting the furrow opener 16 and its standard 18 to the tractor. Mechanism of this kind for floatingly connecting a furrow opener to a tractor or other propelling means is disclosed in more detail in applicant's co-pending application identified above. In the normal plowing position, illustrated in Figure 1, the link 28 is pivoted at 29 to the bell crank 9, and the pivot 29 is so located that a line joining the bell crank pivot 10 and the pivot 29 is disposed approximately perpendicular to the link 28. By virtue of this construction, rocking movement of the bell crank 9 will cause the upper link 28 to shift generally longitudinally, thus pivoting the furrow opener 16 on the lower end of the lower link or plow beam 13. The movement of the furrow opener 16 about the pivot 15 relative to the plow beam 13 serves to angle the furrow opener so that its depth of operation increases or decreases, depending on whether the point of the plow bottom is raised or lowered, and this action is aided by the gauge wheel 20.

Coming now to the feature with which the present invention is more particularly concerned, a gauge shoe 35 is provided with a rounded ground engaging portion 36 and is pivoted, as at 37, on a shaft or other part supported on the lower link or plow beam 13. The member 35 extends downwardly and rearwardly in trailing relation and is adapted to ride along the surface of the ground. This member, or "pilot," constitutes means which responds to changes in the operating depth of the furrow opener 16. A link 39 is pivoted at 41, to the gauge arm 35 and at its forward end is pivotally connected at 42 to a lever 43 that is pivoted at 44 on the tractor, preferably on the hitch angles 12. Preferably, the part 44 consists of a shaft, and on one end of the latter an arm 46 is fixed. The arm is formed as a sector to which a depth adjusting lever 47 is adjustably connected by suitable detent mechanism. The pivot 42 by which the link 39 is connected to the arm or lever 43 is disposed substantially in line with the pivots (not shown) by which the forward end of the lower link or plow beam 13 is connected to the hitch angles 12, the reasons for which will appear below. A link 49 extends from the lever 47 forwardly to an arm 50 which, like the arm 46, is in the form of a sector to which a lever 51 is pivoted. The latter has suitable detent means 52 and in normal operation engages in a notch 53 on the sector 50, as shown in dotted lines. When the detent 52 is out of the notch 53 the arm 50 is free to move relative to the lever 51, and vice versa. The lever 51 is connected by a link 55 to controlling mechanism described below.

According to the present invention, means is provided on the tractor 1 for controlling the depth of operation by energy derived from the tractor motor but controlled by the depth responsive member 35. To this end, the tractor 1 carries a hydraulic unit 60 which preferably is similar to that disclosed in the patent to Harold Brown, issued October 10, 1933, No. 1,929,804; to which reference may be had if necessary. Briefly, the hydraulic unit 60 includes a piston 61 connected to a piston rod 62 that extends outwardly of the hydraulic unit casing 63 and is pivoted, as at 64, to a connecting rod 65 that extends rearwardly and is pivoted at 66 to the upper arm 67 of the bell crank 9. The hydraulic unit 60 is a double acting unit and is provided with suitable valve mechanism by which the piston 61 may be moved into and locked in any desired position. The valve mechanism is preferably enclosed in a section 68 of the casing 63 and is similar to that shown in the above-mentioned Harold Brown patent. Hence, detailed description is not necessary. However, the valve mechanism includes a valve stem 71 that extends outwardly of the valve casing 68 and is pivoted at 72 to the link 55 mentioned above. The position of the valve 71 controls the position and movement of the piston 61. Fluid under pressure is supplied from any suitable means driven by the motor 2, the conduit for the fluid under pressure being indicated by the reference numeral 75. A fluid pump driven by the motor 2 is indicated at 76.

The operation of the modification described above is substantially as follows:

When the outfit is in plowing position, as indicated in Figure 1, and the furrow opener 16 is operating at the desired depth, the parts take the position shown in Figure 1, the valve mechanism 68, 71 serving to hydraulically lock the piston 61 in that position. If, however, the furrow opener 16 should strike a soft spot and tend to plow too deep, the momentary downward movement of the beam 13 while the gauge member 35 remains on the surface of the ground, results in a clockwise movement of the member 35 relative to the plow beam 13 and this in turn causes the arms 43, 46 to move in a clockwise direction and the arm 50 in its dotted line position to swing in a counterclockwise direction (the lever 51 being latched to the arm 50), thus moving the valve stem 71 rearwardly. This movement causes fluid under pressure to be admitted into the cylinder rearwardly of the piston 61. This forces the latter and the link 65 forwardly, and in turn swings the bell crank 9 to force the upper link 28 rearwardly thus raising the plow point and causing the same to seek a more shallow plowing position. As the plow then moves up to its former position, the gauge arm 35 readjusts the linkage so that once again the piston 61 is hydraulically locked, thus holding the longitudinally shiftable link 28 in the position necessary to maintain the desired depth of operation. If the plow should strike a hard spot and operate in a more shallow position, the gauge 35 moves downwardly and, in general, shifts the linkage in the other direction to cause fluid under pressure to be admitted into the cylinder forward of the piston 61, forcing the latter rearwardly and pulling the link 28 forwardly, thus lowering the point and tending to cause the furrow opener 16 to operate at an increased depth. The operating depth that is thus automatically maintained may be varied by latching the hand lever 47 in different positions to the arm 46, the lever 47 thus serving to adjust the operative relation between the valve mechanism of the hydraulic unit 60 and the ground engaging means 35.

The mechanism described above may be arranged, if desired, to raise the furrow opener 16 into transport position. To this end, the lower bell crank arm 31 is provided with an abutment 82 which, in normal plowing position, is spaced well below the link 28, but if the bell crank 9 should be rocked in a clockwise direction (Figure 1), the part 82 will abut the link 28 and bodily raise the furrow opener 16 out of the ground. In order to do this, it is preferable to provide means overriding the automatic depth control member 35, and it is for this reason that the lever 51 and associated parts have been provided. As mentioned above, the normal operating position of the lever 51 is shown in dotted lines in Figure 1. Whenever it is desired, however, to raise the tool 16 to its transport position, the operator releases the detent mechanism 52 from the notch 53 and moves the lever 51 to its full line position (Figure 1), which shifts the valve 71 into a position admitting fluid to the rear side of the piston 61, which causes the piston rod 62 to move to the right (Figure 1) thus first tipping the point of the plow bottom 16 upwardly and subsequently raising the plow 16 bodily into a transport position. During this movement of the plow bottom the ground engaging member 35 remains on the ground, thus moving in a counterclockwise direction (Figure 1) relative to the plow beam 13, until a stop 78 on the arm 46 engages an adjacent portion of the tractor, which then limits further movement of the ground engaging member 35 in a counterclockwise direction relative to the plow beam 13. During such movement of the member 35 relative to the plow beam 13, the connected linkage also moves, including the arm 50, but since the detent 52 is out of the notch 53, the movement of the arm 50 and associated parts now has no control of the valve 71. Hence, as long as the hand lever 51 remains in the position shown in full lines in Figure 1, the plow 16 will be raised. It is desirable, however, to limit the upward movement of the tool, and to this end I mount a stop lug 81 on the rear portion of the piston rod 62, and when the plow bottom 16 reaches its upper position, the lug 81 comes into contact with the arm 51, moving it to the right and thus moving the valve 71 to a neutral or piston locking position.

When it is desired to lower the plow into an operating position, the operator moves the hand lever 51 forwardly, thus actuating the valve 71 and introducing pressure onto the forward side of the piston 61, which forces the piston rod 62 rearwardly and lowers the plow. As the plow lowers, the ground engaging member 35 is first lowered into contact with the ground, and then subsequently moves in a clockwise direction relative to the plow beam and hence actuates the linkage. This motion continues until the corresponding movement of the arm 50, which is counterclockwise (Figure 1) when the plow bottom is lowering and the ground engaging element 35 moving in a clockwise direction relative thereto, brings the notch 53 into a position to be reengaged with the detent 52. When this occurs the hand lever 51 is then reconnected to the arm 50, and the next increment of movement of the latter acts through the arm 51 to move the valve 71 rearwardly from its forward or lowering position to its neutral or holding position. This terminates the lowering movement of the plow bottom so that subsequent operations take place with the bottom automatically controlled so as to be maintained at that depth. It will be noted that the hand lever 51 is actuable when it is desired to raise or lower the plow and that it is unnecessary to change the adjustment effected by the position of the adjusting lever 47.

Reference above was made to the fact that the pivot connection between the forward end of the link 39 and the arm 43, which is mounted on the tractor, is in substantial alignment with the pivot connection between the forward end of the plow beam 13 and the tractor carried angles 12. This is an important feature of the present invention, inasmuch as it permits the plow bottom 16, including the links 13 and 28, to move upwardly and downwardly as the tractor passes over irregularities in the ground surface without in any way interfering with the maintenance of the desired operating depth by the gauge shoe 35; in other words, the plow beam 13 can swing upwardly and downwardly about its pivotal connection with the angles 12, carrying with it the gauge shoe 35 without causing any change in the linkage between the arm 43 and the hydraulic unit 60. By virtue of this arrangement, I am enabled to carry the power actuating depth control on the tractor with the depth responsive gauging member on the implement while at the same time permitting the implement to have free vertical floating movement with respect to the tractor at all times, thus enabling the outfit to negotiate irregular terrain without in any way losing the advantages of automatic depth control.

Figure 2 shows another form of the present invention in which the depth responsive means serves automatically to maintain the plow bottom at the desired depth of operation. Referring now to Figure 2, the reference numeral 101 indicates a farm tractor of conventional construction. The tractor includes a motor 102. The implement is indicated by the reference numeral 105 and includes a furrow opener 106 of the moldboard type secured to the rear end of a plow beam 107. The plow beam extends forwardly underneath the rear axle of the tractor 101 and has its forward end pivotally connected to a bell crank, indicated in its entirety by the reference numeral 110. The latter is supported for rocking movement on a bracket 112 suitably fixed to the tractor, and one arm 113 of the bell crank 110 extends rearwardly and pivotally receives the front end of the beam 107. The latter is therefore capable of rising and falling relative to the tractor by movement around the pivot axis 114. The bell crank 110, and particularly the arm 113 thereof, serves as hitch means connecting the front end of the plow beam 107 with the tractor. A hydraulic power unit 60a, preferably identical for all practical purposes with the hydraulic unit 60 described above, includes a piston rod 62a which is connected by a link 116 to the upper end of the arm 117 of the bell crank 110 so that the latter may be rocked by the application of power from said hydraulic unit 60a. Rocking movement of the bell crank 110 thus serves to raise and lower the front end of the plow beam 107, causing the furrow opener 106 to operate at an increased or at a decreased depth of operation. The valve 71a controlling the operation of the hydraulic unit 60a is connected by means of a link 121 to a hand lever 122, the lower end of which is pivoted to an arm 123 which, like the arm 50 described above, is formed as a sector having a notch 124 with which detent mechanism on the hand lever 122 is adapted to engage so as to lock the hand lever 122 to the sector 123. This is the normal position of the hand lever 122 and is shown in Figure 2 in dotted lines. The lower end of the arm 123 is connected by a link 126 to a sector 127 which is pivoted, as at 128, to the plow beam 107. A ground engaging element 129 is also pivoted on the plow beam 107 at 128 and has its upper end formed with or carrying a hand lever 130 which is provided with detent mechanism 131 adapted to latch the lever 130, and the ground engaging element 129, to the sector 127. It will be noted that the forward pivotal connection of the link 126 with the arm 123 is disposed not far above the level of the pivot 114 and is generally adjacent the pivot connection between the forward end of the beam 107 and the tractor, whereby when the plow beam 107 swings upwardly or downwardly there is relatively little pivoting of the sector 127 on its pivot 128.

The gauge arm 129 operates to maintain the plow 106 at substantially a constant depth and in doing so functions approximately the same as the gauge shoe 35 described above. If the plow bottom 106 should tend to run deeper or more shallow than the depth that corresponds to setting of the hand lever 130 on the sector 127, the latter acts through the link 126, the arm 123, and the lever 122, which is normally latched to the arm 123, to cause the valve 71a to readjust the hydraulic unit 60a to raise or lower the rear end of the bell crank arm 113.

In order to lift the plow 106 to inoperative position, means such as a flexible cable 135 having a rear section 136, passing over a sheave 137 on the tractor, connects the upper arm 117 of the bell crank 110 with a bell crank 138 that is mounted for rocking movement on the rear portion of the tractor. The bell crank 138 includes a rear arm 139 which is connected by a normally slack chain 140 directly to the plow beam 107.

When it is desired to raise the plow into transport position, the operator unlatches the hand lever 122 from the notch 124 and moves the lever 122 from its dotted line position (Figure 2) back to its full line position. This moves the valve 71a in a position to cause the hydraulic unit 60a to force the piston 62a forwardly. This first rocks the bell crank 110 in a clockwise direction (Figure 2), which has the effect of causing the plow bottom 106 to momentarily operate at a more shallow depth. As the forward movement of the piston 62a continues the bell crank 138 is rocked in a clockwise direction and eventually tightens the chain 140 and lifts the plow bodily into its transport position. The resulting counter-clockwise rocking of the depth adjusting gauge shoe 129 has no effect on the hydraulic valve mechanism since the hand lever 122 is disconnected from the arm 123. A stop 141 of the sector 127 serves to limit the counterclockwise movement of the gauge shoe 129 when the plow is raised. When it is desired to lower the plow, the operator moves the hand lever 122 forwardly, thus actuating the hydraulic valve mechanism to cause the piston 62a to be moved rearwardly, thus permitting the bell crank 138 to rock in a counterclockwise direction and lowering the plow. The lowering movement thus continues until the notch 124 reengages the detent mechanism of the hand lever 122, whereupon the next increment of movement shifts the hand lever 122 and moves the valve mechanism of the hydraulic unit back into its holding position. This is substantially the same action as described above in connection with Figure 1 and has all of the advantages thereof, especially as regards being able to raise and lower the plow into and out of its transport position without losing the depth adjustment which it is desired that the gauge shoe 129 and associated parts shall automatically maintain.

While I have shown and described above the preferred means in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An agricultural machine comprising a propelling unit, an implement including a movable ground working tool having suction and a forward point, means connecting said implement with said propelling means to accommodate tipping of the tool and relatively free floating movement of the implement relative to said propelling unit, gauging means movably connected with said implement and movable relative thereto when the operating depth of said tool varies, controllable means on said propelling unit connected with said implement for tipping the point of said tool upwardly or downwardly so as to tend to decrease or increase the depth of operation, means connected with said controllable means for controlling the latter, and means connecting said controlling means with said gauging means and operable by movement of the latter relative to said tool in response to an increase or a decrease in the operating depth of said tool to operate said controllable means and tip the point of said tool upwardly or downwardly, respectively.

2. An agricultural implement adapted to be connected with a tractor having a source of power, said implement having a front end and comprising ground working tool means fixed thereto so that raising or lowering the front end of said implement serves to adjust the operating position of the tool means, movable draft means connecting said implement with the tractor and arranged to accommodate at least vertical movement of the front end of said implement relative to the tractor, means deriving operating energy from such source of power connected to said movable draft means for raising and lowering the front end of said implement so as to control the depth of operation of said tool means, means for controlling said raising and lowering means, ground engaging gauge means movably connected with said implement and movable relative thereto in response to changes in the depth of operation of said tool means, and means connecting said gauge means with said controlling means for operating said raising and lowering means by said source of power under the control of said gauge means.

3. An agricultural machine adapted to be connected with a tractor having a source of power, comprising ground working tool means, a pair of generally vertically spaced draft members connected with said tool means, ground engaging gauge means carried by and movable relative to said tool means in response to changes in the operating depth thereof, means for shifting one of said draft members to control the depth of operation of said tool means, and means controlled by said gauge means for operatively connecting said shifting means with said source of power on the tractor for automatically maintaining said tool means at the desired depth of operation.

4. An agricultural machine adapted to be propelled by a tractor having a source of power, comprising an implement unit, ground working tool means carried by said implement unit, bell crank means for connecting said unit with the tractor for relatively free floating movement, movement of said bell crank means in one direction or the other serving to raise or lower the front end of said tool means, a member pivoted to said implement unit and extending downwardly and rearwardly therefrom in generally trailing relation, ground engaging gauge means carried at the lower end of said member to effect movement thereof relative to said implement unit in response to changes in the operating depth of said tool means, controllable means driven from said source of power for shifting said bell crank means to vary the operating depth of said tool means while accommodating said relatively free floating movement of the implement unit relative to the tractor, means for controlling said controllable means, and means connected with said member and extending to and connected with said controlling means for actuating the controllable bell crank shifting means to maintain the desired depth of operation of said tool means in any position of said implement unit relative to the tractor by shifting said bell crank means.

5. An agricultural machine comprising a tractor, a plow beam movably connected therewith at one end and having a furrow opener at the other end, controllable means on the tractor for raising and lowering said one end of the plow beam to control the depth of operation of said furrow opener, ground engaging gauge means movably connected with said plow beam and movable upwardly or downwardly relative thereto in response to changes in the depth of operation of said furrow opener, means for operating said controllable means for raising and lowering the front end of said beam, and connections between said gauging means and the operating means of said controllable means for causing the latter to raise or lower the front end of the plow beam when said gauge means moves upwardly or downwardly relative to the plow beam.

6. In combination, a tractor, ground working tool means connected with the tractor for generally vertical movement relative thereto into and out of ground working position, means for adjusting the operating depth of said tool means, ground engaging means movably connected with said tool means, being movable relative to the latter in response to changes in the depth of operation of said tool means, disconnectible means connecting said ground engaging means with said adjusting means, and means for disconnecting said disconnectible means.

7. An agricultural implement comprising a ground working unit including tool means of the type having suction and tiltable at its front end in a generally vertical direction to cause the tool means to tend to run to a deeper or to a more shallow operating position, ground engaging means movably connected with said unit and movable relative to said tool means in response to changes in the operating depth thereof, controllable power operated means for changing the angular position of said tool means, means for controlling said controllable means, and means operatively connecting said ground engaging means with the controlling means of said power operated means for causing the latter to tilt the tool means and maintain substantially uniform penetration of said tool means.

8. An agricultural machine comprising a supporting frame, an implement including ground working tool means of the type having suction and tiltable in a generally vertical direction to cause the tool means to tend to run to a deeper or a more shallow operating position, hitch means connecting the implement with said supporting frame, ground engaging means carried by said implement and movable relative to said tool means in response to changes in the operating depth of the latter, and means controlled by said depth responsive means for adjusting the position of said hitch means so as to maintain substantially uniform penetration of said tool means.

9. An agricultural machine comprising supporting means, an implement including ground working tool means of the type having suction and tiltable in a vertical longitudinal plane to cause the tool means to tend to run to a deeper or to a more shallow operating position and a pair of links connecting said tool means with said supporting means for generally vertical floating movement relative thereto, ground engaging means carried by said implement and movable relative to said tool means in response to changes in the operating depth thereof, and means controlled by said depth responsive means for moving one of said links generally longitudinally for adjusting the angle of tilt of said tool means so as to maintain substantially uniform penetration thereof.

10. An agricultural implement adapted to be connected with a tractor having a controllable power operated unit, said implement comprising tool means, means adapted to be connected with said unit and deriving operating energy therefrom for adjusting the position of said tool means, means movable relative to said tool means in response to changes in the position thereof relative to the ground, means for controlling said controllable power operated unit means including disconnectible parts for connecting said movable means with said controlling means for operating the controllable power operated unit from said movable means, and means for disconnecting said parts so as to interrupt the connection between said position responsive means and said controlling means to provide for raising said tool means independently of said position responsive means.

11. An agricultural implement adapted to be attached to a tractor having an implement-operating power unit and a control valve therefor, comprising a ground working tool having suction and including a ground penetrating point, means for connecting the tool with the tractor for tilting movement in a generally vertical direction during operation, tilting of said ground working tool serving to raise or lower the ground penetrating point of the tool so as to cause the tool to run deeper or more shallow, means adapted to be connected with said unit for tilting said tool in one direction or the other, a ground engaging member disposed adjacent and movable relative to said tool in response to changes in the operating position of said tool, and operating means adapted to be connected between said ground engaging member and said control valve unit.

12. The invention set forth in claim 11, further characterized by a manual control incorporated in said operating means for controlling said valve unit independently of said ground engaging member.

13. An agricultural implement adapted to be attached to a tractor, comprising a generally longitudinally extending tool beam, a ground working tool having suction connected to the rear end of said tool beam, a bell crank adapted to be pivotally mounted on the tractor and connected with the front end of said tool beam, whereby rocking movement of said bell crank raises or lowers the front end of said tool beam, thereby tending to cause the tool to operate deeper or more shallow, means disposed adjacent and movable relative to said tool in response to changes in the depth of operation of said tool, controllable mechanism deriving operating energy from said tractor for shifting said bell crank, means for controlling said mechanism, and means connecting said depth responsive means with said controlling means whereby operation of said depth responsive means acts through said controlling means and said mechanism for raising or lowering the front end of said tool beam.

14. In combination, a tractor, ground working tool means connected with the tractor for generally vertical movement relative thereto into and out of ground working position, means for adjusting the operating depth of said tool means, ground engaging means movably connected with said tool means, being movable relative to the latter in response to changes in the depth of operation of said tool means, disconnectible means connecting said ground engaging means with said adjusting means, means for disconnecting said disconnectible means, and stop means acting between said depth responsive means and said tool means for limiting the movement of the depth responsive means relative to said tool means when the latter is raised out of its ground working position.

WALTER H. SILVER.